United States Patent
Rose, III et al.

(10) Patent No.: US 7,024,279 B2
(45) Date of Patent: Apr. 4, 2006

(54) INTERPOLATION USING RADIAL BASIS FUNCTIONS WITH APPLICATION TO INVERSE KINEMATICS

(75) Inventors: Charles F. Rose, III, Redmond, WA (US); Peter-Pike J. Sloan, Bellevue, WA (US); Michael F. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 85 days.

(21) Appl. No.: 10/875,775

(22) Filed: Jun. 24, 2004

(65) Prior Publication Data

US 2004/0233202 A1 Nov. 25, 2004

Related U.S. Application Data

(63) Continuation of application No. 10/170,751, filed on Jun. 13, 2002, now Pat. No. 6,856,319.

(51) Int. Cl.
  *G06F 19/00* (2006.01)

(52) U.S. Cl. ............... 700/245; 700/252; 700/250; 345/474; 345/475; 703/2; 382/100

(58) Field of Classification Search ............... 700/245, 700/252, 250; 345/474, 475; 703/2; 382/100
See application file for complete search history.

(56) References Cited

U.S. PATENT DOCUMENTS

| | | | | | |
|---|---|---|---|---|---|
| 6,163,323 | A | * | 12/2000 | Intriligator | 345/473 |
| 6,253,165 | B1 | * | 6/2001 | Malvar | 703/2 |
| 6,462,742 | B1 | * | 10/2002 | Rose et al. | 345/473 |
| 6,714,201 | B1 | * | 3/2004 | Grinstein et al. | 345/474 |
| 6,762,760 | B1 | * | 7/2004 | Deering | 345/426 |
| 6,856,319 | B1 | * | 2/2005 | Rose et al. | 345/474 |
| 2004/0036716 | A1 | * | 2/2004 | Jordahl | 345/713 |
| 2004/0071312 | A1 | * | 4/2004 | Ogawa et al. | 382/100 |

OTHER PUBLICATIONS

Lin et al., Manipulator control with torque interpolation, 1990, IEEE, p. 624–626.*

Rose, C.F. III, et al. "Artist–directed inverse–kinematics using radial basis function interpolation", *Eurographics*, 2001, 20(3), 13 pages.

Rose, C. et al., "Verbs and Adverbs: Multidimensional motion interpolation", *IEEE Computer Graphics and Applications*, Sep./Oct. 1998, 32–40.

Peter–Pike Sloan, et al., "Shape and Animation by Example", Jul. 200, 1–22.

Wiley, D.J. et al., "Interpolation synthesis of articulated figure motion", *IEEE Computer Graphics and Applications*, 1997, 17(6), 39–45.

Zhao, J. et al., "Inverse kinematics positioning using non-linear programming for highly articulated figures", *ACM Transactions on Graphics*, 1994, 13(4), 313–336.

* cited by examiner

*Primary Examiner*—Thomas Black
*Assistant Examiner*—McDieunel Marc
(74) *Attorney, Agent, or Firm*—Woodcock Washburn LLP

(57) ABSTRACT

A technique for solving an inverse-kinematic problem by interpolating solutions from examples. Example poses or motions of an object are collected and annotated. The annotations are essentially parameters for a function—i.e., the function X(p) generates degree-of-freedom values of an object that is posed in a manner that satisfies parameters p. The analytic function X is interpolated from these examples and improved automatically based on kinematic measurements. Preferably, the interpolation is created by taking a weighted sum of cardinal basis functions having linear and radial parts, Preferably, the interpolation is a weighted sum of cardinal basis functions having linear and radial portions.

22 Claims, 5 Drawing Sheets

Panel 1

Panel 2

Panel 3

Panel 4

INTERPOLATION USING RADIAL BASIS FUNCTIONS WITH APPLICATION TO INVERSE KINEMATICS

CROSS-REFERENCE TO RELATED CASES

This application is a continuation of U.S. patent application Ser. No. 10/170,751, entitled "Interpolation Using Radial Basis Functions With Applications to Inverse Kinematics," filed on Jun. 13, 2002, now U.S. Pat. No. 6,856,319.

FIELD OF THE INVENTION

The present invention relates generally to the field of computer graphics. More particularly, the invention provides a technique for interpolating solutions to inverse-kinematic problems using radial basis functions.

BACKGROUND OF THE INVENTION

One of the most common tasks in computer animation is "inverse-kinematics." Inverse-kinematics (IK) is concerned with the positioning (or "posing") of animated objects—e.g., determining a joint configuration required to place a particular part of an articulated figure at a particular location in global space. For example, if the figure to be posed is an arm that has an elbow and a wrist, the question of how to orient the wrist and bend the elbow such that the hand is in a particular location is an IK problem. IK is used, for example, in commercial 3D animation packages, motion capture analysis, robot motion planning, and game software, to name a few applications.

Inverse-kinematics is one of the oldest problems in computer animation, tracing its origins back to the problem of positioning industrial robots, A number of techniques have been developed to position an articulated figure. All such techniques reveal a tension between quality and expenditure of resources. Positioning an articulated figure with rotational degrees of freedom (or, for that matter, determining the motion of such a figure) is non-linear and computationally expensive. Thus, the most accurate techniques are often unsuitable for applications where figures must be posed or set in motion in real-time (e.g., a game), and faster algorithms often make use of approximations that, while efficient to compute, make the pose seem less "natural."

The simplest IK techniques approximate the problem as a linear one. For example, when the change in a figure's position is small (i.e., the starting configuration is near the desired one), iterative linear approximations may be used to compute the position. For more complex motions, however, this simple technique may produce insufficient results.

Other techniques are based on non-linear optimization. These techniques typically have a run-time that is highly dependent on the difficulty of the task; additionally, many of these optimizations make use of a "guess," so the run-time is also dependent on the quality of the guess. Thus, the amount of time that it takes to solve a given IK problem is unpredictable, which is undesirable in real-time applications. Additionally, many non-linear IK techniques make little use of the large body of human biomechanics knowledge.

Synergy-based IK uses a measure of how much a particular joint contributes to a given IK task (the synergy), in order to reduce the dimensionality of the problem and to help ensure that the results are human-like. This technique, however, in turn relies on complex biomechanical models of how creatures move. Since that body of knowledge does not encode the full gamut of human motions, synergy-based IK cannot fulfill many desired IK tasks.

Example-based IK interpolates a range of poses from discrete examples often generated via motion capture, hand animation, or costly biomechanical simulation. These techniques may produce high-quality poses and may achieve good runtime efficiency; however they suffer from high memory requirements due to the large number of examples required by existing techniques in order to achieve high fidelity, which makes them unattractive for real-world applications. Moreover, existing example-based techniques typically fail to address the fact that an example may have a limited range of influence—that is, an example's relevance in interpolating a pose is diminished, if the parameters of the pose are relatively distant from the parameters of the example.

In view of the foregoing, there is a need for a system and method that combines the real-time, artist-directed quality of example-based techniques and which also overcomes the drawbacks of the prior art.

SUMMARY OF THE INVENTION

The present invention provides a technique for creating an interpolation function for solving a given inverse-kinematic problem, where the function is based on example poses.

A typical inverse kinematic problem is the positioning of a figure that has one or more "degrees of freedom"—i.e., aspects that can be positioned in a variety of ways. (As discussed below, the invention is not limited to the positioning of figures, but also may be used to generate the trajectory through time of such a figure. For the purpose of creating an example to use throughout the description herein, we shall frequently refer to "positioning" or "posing" of a figure. However, those of skill in the art will understand that the techniques can be readily applied to the creation of motions for figures.) In accordance with the invention, example poses are collected. Parameters are assigned to the examples to annotate the examples and place them at points in the space defined by the parameters. An interpolation function is created that generates poses (or motions) as a function of a set of parameters, where the function is designed to pass through all of the annotated example points. Optionally, the interpolation function may be evaluated according to some criteria and improved through the addition of examples or pseudo-examples. Once an acceptable interpolation function has been created, the function may be applied to any set of parameters to generate a new pose for the object. This last step can be performed with high efficiency, making the technique applicable to real-time applications and applications on devices with little computational power.

For example, an object to be posed may be an arm that comprises a hand, a forearm, and an upper arm. The hand and forearm are joined at a wrist, and the forearm and upper arm are joined at an elbow. The orientation of the wrist and the bend of the elbow are the "degrees of freedom" of the arm; the pose of the arm can be described in terms of the values for these "degrees of freedom." A computer application may need to pose the hand touching various places on a white board, and thus it is desirable to create a function that creates a pose for the arm based on what position on the white board the hand is touching. In this case, examples may be generated by having a human model touch various places on the white board and capturing the position of the wrist and elbow (or by having an artist draw such poses). The "annotation" of this data is the position (e.g., x-y coordinates) of the point on the white board that the hand touches in each example. Thus, data is created that correlates a position of the hand with a setting for the wrist and elbow. The x-y position of the hand can be viewed as two parameters (i.e., the parameters of the interpolation function that will be created).

Based on these annotated examples, a function is created, F(x,y)→(wrist, elbow), that maps a point that the hand touches on the white board to a set of values for the wrist and elbow. (Or, more generally, the function maps a point in a parameter space to a set of degree-of-freedom values.) In a preferred embodiment, the function is created by creating a set of cardinal basis weighting functions having both radial and linear parts, where the interpolation function is based on a sum of these cardinal basis functions.

After the interpolation function is created, it is optionally evaluated to determine whether it meets some criteria (e.g., freedom from warp, fidelity of IK results, etc.). If these criteria are not met, the function is improved by adding either real examples or pseudo-examples. Real examples are additional data (e.g., additional poses by a human model, additional artist-drawn examples, etc.); when such real examples are collected, the interpolation function is re-created based on the additional data. A pseudo-example is based on a re-working of the weighting functions in order to cause the interpolation function to pass through a given point.

Once the interpolation function is created (and optionally improved), the function may be used to create a pose for a figure (or, as noted above, a trajectory through time for a figure). This function can be used to evaluate the character's pose (or trajectory) for any desired parameter setting, not just those for which examples or pseudo-examples were offered. For example, once the interpolation function is created for a reaching motion, the character can be positioned to reach for places which were not specified in the original data.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Much of the power of computer graphics lies in the fact that a computer can animate a figure. Prior to computer graphics, every position of an animated figure needed to be drawn by a human illustrator. Now, a computer can be instructed to pose an object (or create a motion for an object) in accordance with some constraint (e.g., position an arm touching a white board at coordinates (x,y), position the quarterback on the 50-yard line, etc.) and the computer can generate the pose (or motion). The present invention provides a technique for creating a function to generate this pose (or motion). Inasmuch as the invention applies to both poses and motions, we shall use the term "manipulation" to describe the animation of an object, whether that manipulation produces a still "pose" for the object, or a motion (i.e., a trajectory through time) of such an object.

Exemplary Computing Environment

Figure 1:
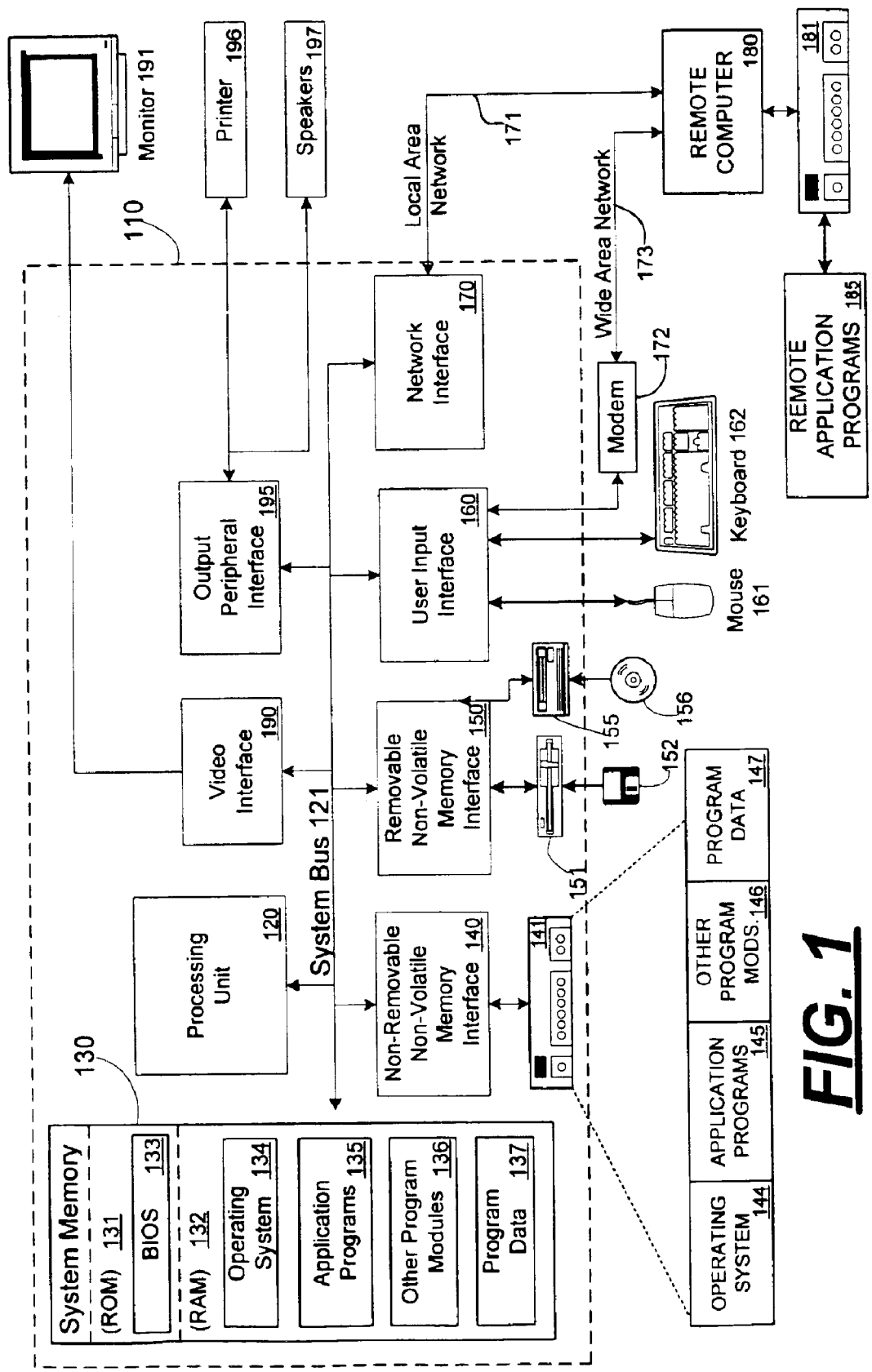
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, video game consoles, stand-up arcade machines, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Inverse Kinematics

Figure 2:
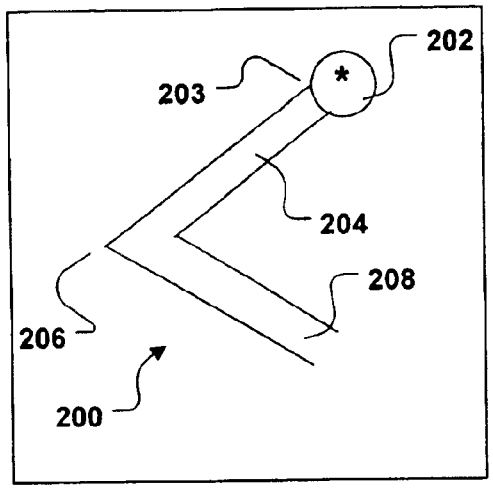
FIG. 2 is a diagram of an exemplary object posed in a variety of positions under a common constraint.
Figure 2:
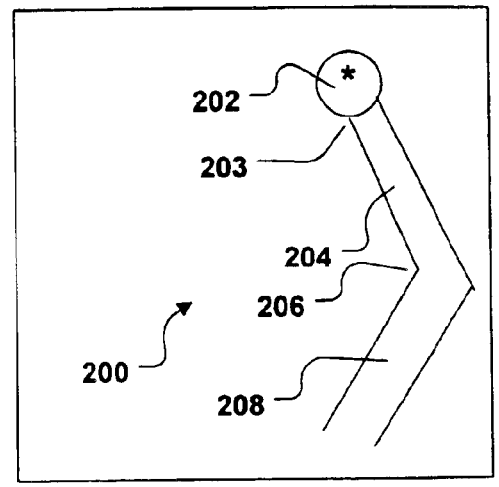
Figure 2:
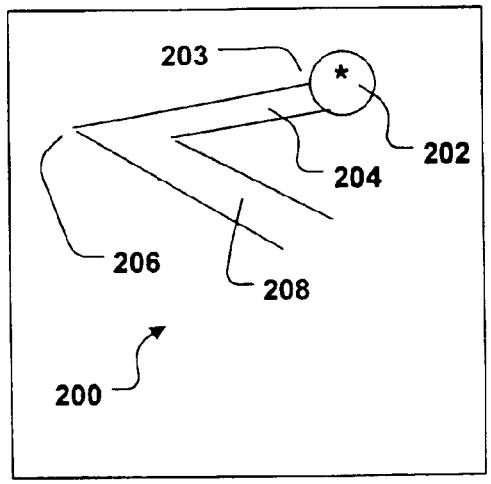
Figure 2:
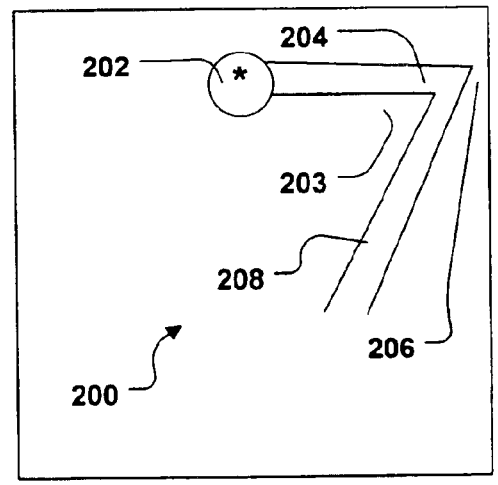

As noted above, inverse kinematics (IK) addresses the question of how to "pose" an animated object, given some constraint. An IK problem arises from the fact that the object to be posed typically has one or more "degrees of freedom" that can assume some continuous range of values, and thus there may be an infinite number of ways to pose the object while satisfying the constraint. FIG. 2 shows how a single object can be posed in various different ways.

In FIG. 2, the object to be posed is an arm 200. The simplified diagram of an "arm" comprises a hand 202, a wrist 203, a forearm 204, an elbow 206, and an upper arm 208. The constraint imposed on the posing of arm 200 is that hand 202 is to be placed on the plus sign. Panels 1, 2, 3, and 4 show various poses of arm 200, wherein hand 202 is placed on the plus sign. In this example, arm 200 has at least two degrees of freedom: (1) the orientation of wrist 203 (as indicated by the direction in which forearm 204 extends from hand 202), and (2) the angle between forearm 204 and upper arm 208. In a more complex object (e.g., an entire body, in which arms, legs, wrists, ankles, waist, facial muscles, etc. could move individually), there would be many degrees of freedom; however, the two movable elements (elbow 206 and wrist 203) of arm 200 demonstrates the point that degrees of freedom allow a single object to be posed in a variety of ways.

Some of the poses shown in FIG. 2 may be more natural, or more aesthetically pleasing, than others. For example, panel 3 shows elbow 206 at a very severe bend, whereas panel 2 shows a much more gentle bend. In theory, biometric data about the movement of human arms could be used to identify which of these poses is more realistic. However, another way to generate a realistic-looking pose is to base the position on a real-world example. For example, in order to determine what an arm looks like when touching the point with the plus sign, the plus sign could be drawn on a white board, and a human model could be instructed to touch it. Then, the position of the model's arm can be observed, and the data can be used to determine how arm 200 should be positioned in order to look natural when touching the plus sign. (It should be noted that "natural" or "realistic" looking arms are not the only conceivable goal. For example, the arm may belong to a space alien in a video game, in which case the goal in positioning the arm may be to achieve an unnatural or "other-worldly" look. In this case, an artist may envision the movement and positioning of arm 200, and the "real-world" example may be a drawing by the artist rather than a photograph of a human being.)

Figure 3:
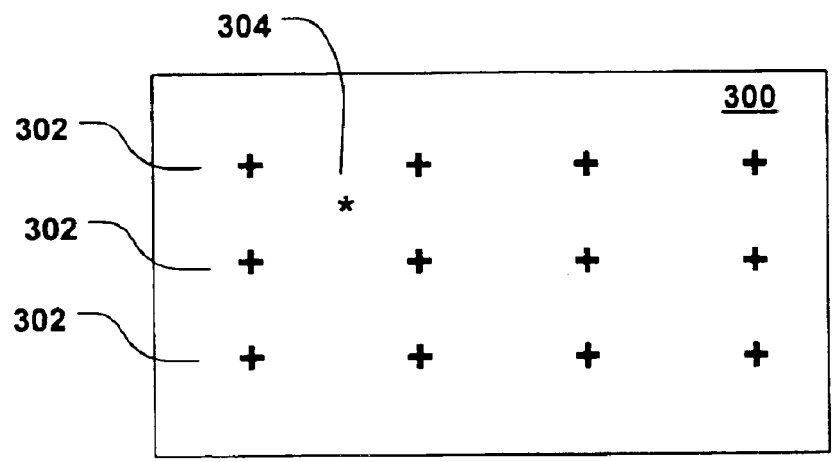
FIG. 3 is a diagram of an exemplary environment for collecting sample points in accordance with a feature of the invention.

A problem with using examples to determine the correct pose of an object that can be posed in various ways is that it is not practical to collect an example to cover every possible pose. For example, in order to determine realistic positions of arm 200, a person can be instructed to touch each of the plus signs 302 on white board 300 shown in FIG. 3, and the person can be photographed touching each of the fifteen plus signs 302. (FIG. 3 shows the plus signs in a regular grid pattern; however, there is no requirement that the sample points be collected in such a pattern. Rather, any sample points may be used whether or not they form the regular pattern shown in FIG. 3.) This process creates fifteen sample data points about what an arm looks like when touching various places on white board 300. No data is captured about what the arm looks like when touching asterisk 304. However, arm 200 can be posed touching asterisk 304 by interpolating the correct pose from nearby data points—e.g., from data that shows what an arm looks like when touching plus signs 302 that are located adjacent to asterisk 304.

What follows is a discussion of a technique for solving the inverse-kinematics problem—i.e., posing an object—by using radial basis functions to interpolate the pose from known examples.

It should also be noted that the above comments relating to poses can also be applied to motions. That is, some motions may appear more natural than others, and it is possible, in accordance with the invention, to interpolate natural- or realistic-looking motions by collecting examples of motions, and interpolating motions whose parameters fall "in between" the examples. As noted above, the term "manipulation" of an object covers both a still pose of an object and a motion of an object.

Exemplary Process of Positioning or Moving an Object

Figure 4:
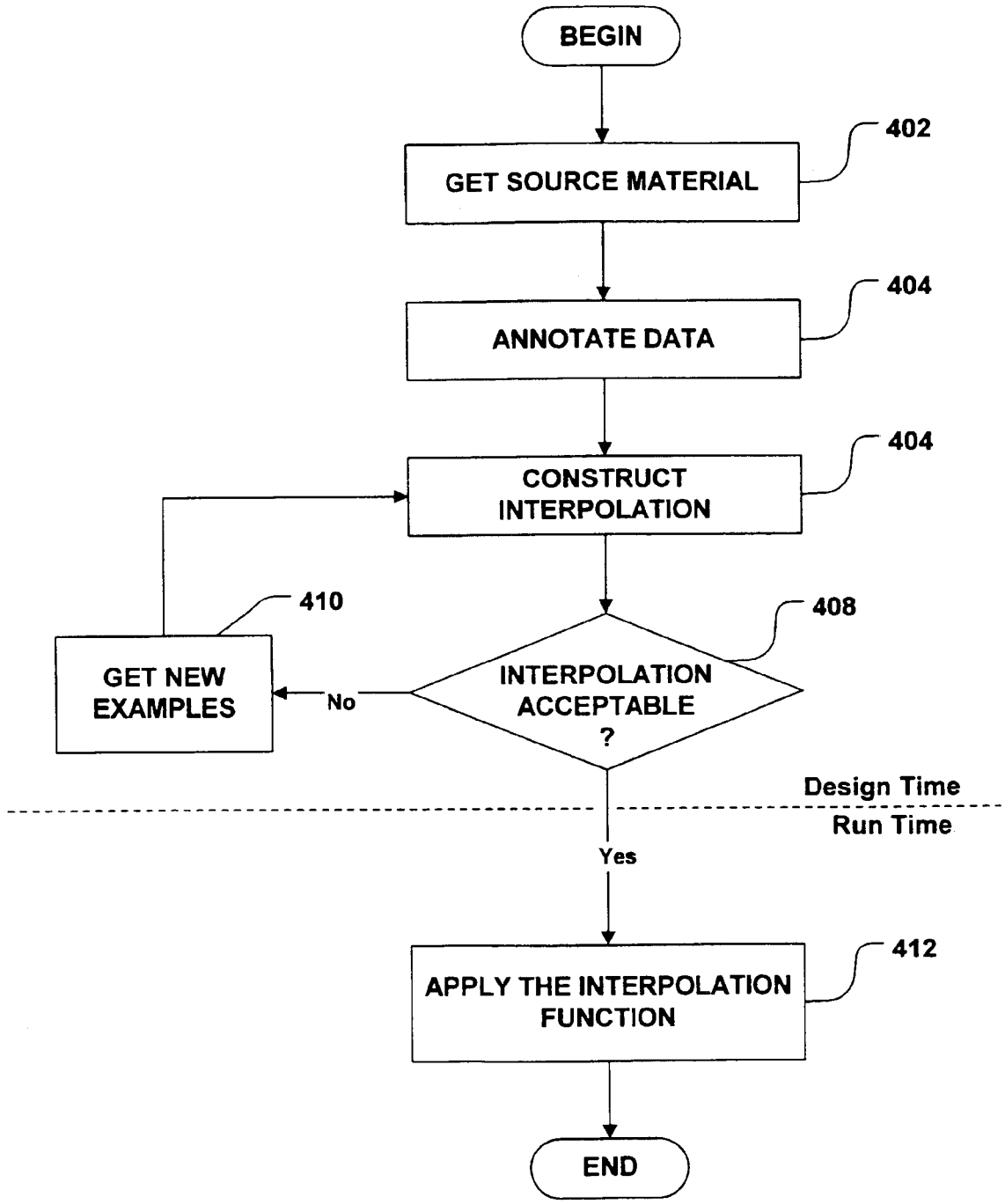
FIG. 4 is a flow diagram of an exemplary process for posing an object in accordance with aspects of the invention.

FIG. 4 shows an exemplary process for positioning or moving an object in accordance with aspects of the invention. As an overview, the process comprises: getting source material (i.e., examples) at step 402; annotating the collected data (step 404); constructing an interpolation based on the collected data (step 406); evaluating the interpolation to determine whether it is acceptable under some criteria (step 408); if the interpolation does not meet the criteria, then adding new real-examples or pseudo examples (step 410) and reconstructing the interpolation (step 406). Once the interpolation has been constructed, a pose or motion may be generated by applying the interpolation function to a given set of parameters (step 412).

Below, the various steps of the process shown in FIG. 4 are each described in greater detail.

Collection of Source Material—Step 402

At step 402, source material (i.e., data) is collected. In essence, source material refers to examples from which other values can be interpolated. Recording the position of a human arm touching various data points on white board 300 is an illustration of the collection of source material. As another illustration of this collection process, an artist might create several 3-dimensional poses of a computer character in various poses, where these poses collective make up the source material. The source material that is collected at step 402 may be either poses of an object, or motions of such an object.

Annotation of Collected Data—Step 404

At step 404, the data collected at step 402 is annotated. Annotation of the data refers to cataloging and quantifying it in some manner so that it can form a basis for interpolation.

One way to understand the annotation of data is to view the position of an object as the function of a particular constraint. For example, the pose of arm 200 could be represented by two values: $\Theta_1$, which represents the orientation of wrist 203, and $\Theta_2$, which represents the angle of elbow 206. These values are a function of the constraint under which the arm is to be posed. In the example above, the location on white board 300 that hand 202 is required to touch is the constraint. Thus, if the position of hand 202 can is described by coordinates (x,y), a goal of the process depicted in FIG. 4 is to construct the function $F(x,y) \to (\Theta_1, \Theta_2,)$, i.e., a function that takes a constraint as input and that produces a pose as output. As discussed below, this function is actually an analytic function, but the analytic function is derived from known data points. Step 404 seeks to catalogue the known data points so that the more general analytic function can be derived.

As a specific example, suppose that a human model is told to place his hand at coordinates (0,0), (0,1), (1,0), and (1,1) on white board 300. (Any coordinate system may be used to describe locations on white board 300, but imagine for the sake of example that these coordinates represent positions along the x and y axes of a Cartesian plane superimposed over white board 300.) Further suppose that, at these various points, the model's hand has values for $\Theta_1$ and $\Theta_2$ of (1,6), (2,4), (5,2), and (7,7), respectively. ($\Theta_1$ and $\Theta_2$ are angles that describe the orientation of wrist 203 and elbow 206; assume, for the purpose of this example that unit in which these angles are measured is a degree on the normal scale where a full-circle rotation is 360 degrees.) Thus, the known data points are:

$F(0,0) \to (10,60)$, $F(0,1) \to (20,40)$, $F(1,0) \rightarrow (50,20)$, $F(1,1) \rightarrow (70,70)$.

As discussed below, step 406 seeks to create an analytic function that passes through these four sample data points.

In the example above, the annotation is performed by measuring the orientation of wrist 203 and the angle of elbow 206 at various positions, and correlating each value produced with the particular constraint (i.e., the (x,y) coordinates of a position on white board 300) that produced the value. In this example, all of these quantities are essentially objective measurements, although it should be understood that there could be a component that requires subjective quantification. (Such "subjective" quantification is described in greater detail below.)

One way to view the pose of an object as a function of some constraint is as a set of "verbs" and "adverbs." In this sense, the function F is a "verb" (i.e., the imperative "pose the object"), and the parameters of the function (i.e., the coordinates of the position at which the hand is to be posed) are the "adverbs" that modify the verb. Thus, in the sentence "pose the arm with its hand at position (0,0)," the phrase "pose the arm" is a verb, and "with its hand at position (0,0)" is an adverb that modifies the verb. (Or, another way to view the "adverb" is that (0,0) is really two adverbs: one adverb describing the x coordinate of the hand, and the other adverb describing the y coordinate.)

In the above example, the phrase "with its hand at position (0,0)" is an "objective" adverb, in the sense that the coordinates of the hand to be positioned are an objectively measurable quantity. Some adverbs may not be so objective. For example, a human model may be instructed not merely to place his hand on coordinate (0,0), but to do so "lacklusterly," (or "enthusiastically," or somewhere in between). In this sense, the level of "lacklusterness" can be viewed as another adverb that modifies the verb "pose the arm." For example, perhaps "lacklusterness" can be quantified on a scale of −5 to 5. (The quantity of lacklusterness may be impossible to define objectively; the point, however, is that it can be quantified in some manner—perhaps by a human being making a subjective judgment as to how lacklusterly (or enthusiastically) the model touches the points on the whiteboard.) Thus, if a model is observed to place his hand on point (0,0) in an extremely lackluster manner, then F may be viewed as a function of the three adverbs (x, y, L) (where L=the amount of lacklusterness) such that the proper annotation of this data point is:

$F(0,0,5) \rightarrow (10,60)$, which indicates that the data collected represents an extremely lackluster manner of touching white board 300. Continuing with this example, another data point might be $F(0,1,-3) \rightarrow (20,40)$, which represents a relatively (but not completely) enthusiastic manner of touching white board 300 at point (0,1).

As noted above, the process of FIG. 4 can be applied to motions as well as poses. For example, if the data captured at step 402 is the trajectory of an arm rather than a still pose of an arm, then the annotation of data at step 404 refers to the motion of the arm rather than the final pose of the arm. In the example above, F(0,1,−3) was used to describe the pose of an arm that has been enthusiastically placed at position (0,1), but it could be also used to describe the trajectory of an arm as it is being enthusiastically placed at position (0,1).

Mathematical Representation of Annotated Data

In the discussion above, a simple system of mathematical symbols is used to describe the posing of an object. In this simplified mathematical system, the imperative to pose an object (i.e., a "verb") is a function, the "adverbs" describing how and where the object is to be posed are the parameters of the function, and the output of the function is a set of values for those aspects of the object for which a degree of freedom exists. The following is a more formal (and more general) mathematical treatment of how poses or motions can be represented. Table 1 shows the terminology used in this mathematical treatment.

TABLE 1

| Object | Variable | Subscript | Range |
| --- | --- | --- | --- |
| Example | X | I | 1 . . . N |
| Degree of Freedom (DOF) | x | i | 1 . . . N |
|  |  | j | 1 . . . M |
| Point in Adverb Space | p | i |  |
| Radial basis | R | i |  |
| Radial Coefficient | r | i, j |  |
| Linear Basis | A | l | 0 . . . D |
| Linear Coefficient | a | i, l |  |
| Distance | d | i |  |
| Keytime | K | m | 1 . . . NumKeys |

In the language defined above, an example is denoted as $$X_i = \{x_{ij}, p_i, K_m\} \quad (1)$$

where i is fixed for a particular example $x_i$, j ranges from 1 . . . M, the number of DOFs in the system, and m ranges from 0 . . . NumKeys. Each $x_{ij}$, the j-th DOF for the i-th example represents a DOF curve represented in some fashion such as a B-spline, Fourier decomposition, etc. In terms of the simplified terminology used above, the above-notation essentially means that, if F is the "verb" to be constructed from examples, then $F(p_i)=(x_{i1}, \ldots, x_{ij})$ for the i-th example. Thus, $p_i$ is essentially the annotation (i.e., the "adverbs") of sample data $(x_{i1}, \ldots, x_{ij})$. (Keytimes, which were not discussed in the simplified terminology, are values that help to time-warp example motions so blending can occur between corresponding poses. K is the set of keytimes that describe the phrasing (relative timing of structural elements) of the example. Based on the keytime annotation for each example, the curves are all time-warped into a common time frame. Keytimes are, in essence, additional DOFs and are interpolated at runtime to undo the time-warp. Time-warping, and the benefits thereof, is known in the art.)

We shall return to this notation (and to the various elements defined in Table 1) in discussing the mathematics behind the various steps of the process shown in FIG. 4.

Construction of an Interpolation—Step 406

After the data has been annotated, an interpolation is constructed based on the annotated data (step 406). The process of constructing an interpolation is analogous to spline-fitting, in the sense that the aim is to produce a smooth curve that passes through all of the known sample data points.

In a preferred embodiment of the invention, the interpolation is constructed as a sum of cardinal basis functions. If there are n examples, the basic technique is to choose n functions, such that each function passes through one of the examples but has a zero value at all of the other examples. Thus, the sum of the functions is a new function that passes through all of the examples, where each of the constituent functions influences the overall interpolation in the neighborhood of the example through which it passes. In a preferred embodiment of the invention, this technique is performed using radial basis functions.

Figure 5:
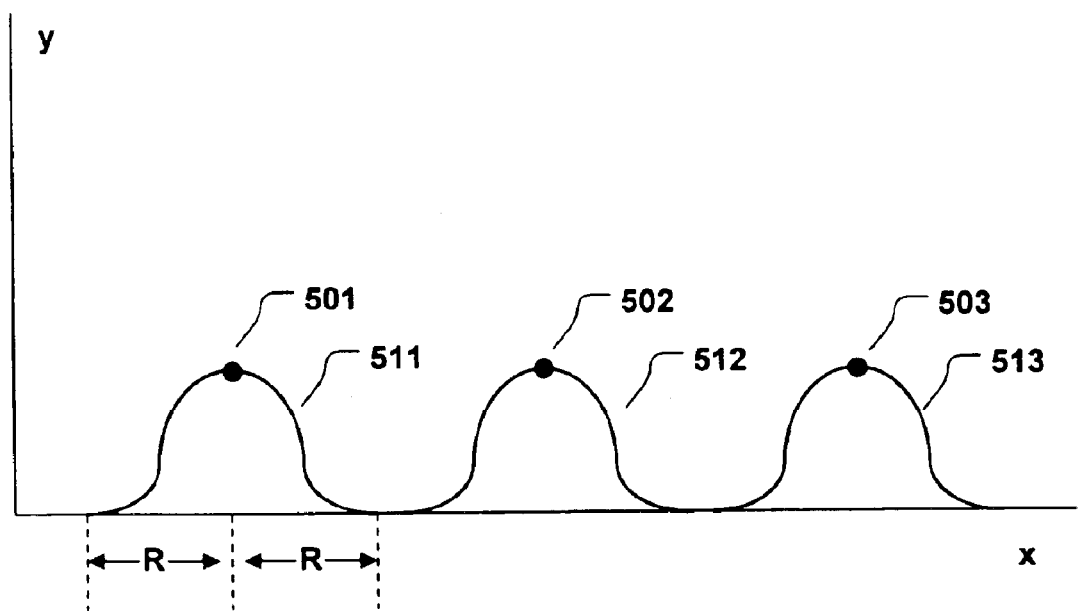
FIG. 5 is a diagram showing exemplary radial basis functions, which are used in accordance with an aspect of the invention.

The details of a preferred technique for constructing the interpolation are described below. However, prior to discussing the details, FIG. 5 shows a simple example of how an interpolation can be constructed from radial basis functions. FIG. 5 shows three data points 501, 502, and 503 in the space defined by the x and y axes. Suppose it is desired to interpolate y as a function of x—i.e., to identify an analytic function f(x)=y that passes through data points 501, 502, and 503. In relation to prior examples, f may be a "verb," x may be an "adverb," and y may be a degree-of-freedom value; however, notion of interpolating based on examples is not limited to inverse-kinematic quantities described in terms of "verbs" and "adverbs." The function f may be created by identifying, for each point, a function that passes through that point and adding the functions together. Thus, function 511 passes through data point 501, function 512 passes through data point 502, and function 513 passes through data point 503. Each function has a defined radius of influence, such that the function's influence on the whole interpolation function drops to zero at some distance away from the data point along the x axis. For example, the radius of influence function 511 extends along the x-axis in the amount R in either direction from point 501. In particular, it will be noted that each function has a zero value at all of the example points, except for the example point that the function passes through. This fact means that the sum of functions 511, 512, and 513 passes through points 501, 502, and 503, since none of the constituent functions has any influence on the sum at any example point other than the point that the constituent function passes through (although the functions may have influence near that point.) Both x and y here are likely to be vector values. The technique of the present invention is, in general, multidimensional in both domain and range.

Mathematical Description of a Preferred Technique for Creating an Interpolation

The following describes a preferred technique for creating the interpolation function—i.e., the analytic function that represents the "verb." The technique is described in the mathematical terms defined above in Table 1.

Given a set of examples, a continuous interpolation may be generated over the abstract space (i.e., the space of annotation values used at step 404) for the verb. A goal is to produce at any p in the abstract space, a new motion or pose X(p) (i.e., with X being the "verb," and p being the "adverb") derived through interpolation of the example motions or poses. When p is equal to the position $p_i$ for a particular example i, then X(p) should equal $X_i$. In between the examples, smooth intuitive changes should take place. This is the classic multivariate interpolation problem.

When interpolation is performed using a "cardinal basis," one interpolation is formed for each example. This function determines the weight given to that particular example over the entire space and is defined to have a value of 1 at the example location and 0 at the locations of all the other examples. Given this, it is clear that this will form an exact interpolation.

The shape of the individual cardinal basis function is something we can select. The problem this shape selection addresses is that of the standard multidimensional scattered data interpolation problem, that of creating interpolations which interpolate the data while maintaining smoothness between the example. Many existing scattered data interpolation methods focus on one- and two-dimensional problems; these relatively simple schemes (e.g., linear interpolation using Delauney triangulation) does not scale well in high dimensions. Radial basis function based approaches, on the other hand, scale well to high dimensions.

In a preferred embodiment, the cardinal basis weighting functions are defined as $$w_{iI}(p) = \sum_{i_2=1}^{N} r_{i2,iI} R_{i2}(p) + \sum_{l=0}^{D} a_{iI,l} A_l(p) \tag{2}$$

where the $r_{i2,i1}$ and $R_{i2}$ are the radial basis function weights and radial basis functions themselves and $a_{i1,l}$ and $A_l$ are the linear coefficients and linear bases. The subscripts $i_1$ and $i_2$ are indices of examples. Given these bases, the value of each DOF is computed at runtime based on the momentary location, p, in the abstract space. The value for each DOF, $x_j$, at location p is defined as $$x_j(p) = \sum_{i_1=1}^{N} w_{iI}(p) x_{iI,j} \tag{3}$$

The linear function provides an overall approximation to the space defined by the examples and permits extrapolation outside the convex hull of the locations of the examples. The radial bases locally adjust the solution to exactly interpolate the examples.

In the preferred embodiment, the first step in forming the interpolation is, for each example i, to fit (in a least squared sense) a hyperplane to the values 1 at the location of the i-th example location, and 0 at all other example locations. This defines N separate least squares problems of the form $$p_h a = F \tag{4}$$

where $P_h$ is a matrix of homogeneous points in the abstract space (i.e., each row is a point location followed by a 1), a are the unknown linear coefficients, and F is a "fit" matrix expressing the values we would like the linear approximation to fit. In this case F is simply the identity matrix since we are constructing a cardinal basis.

Figure 6:
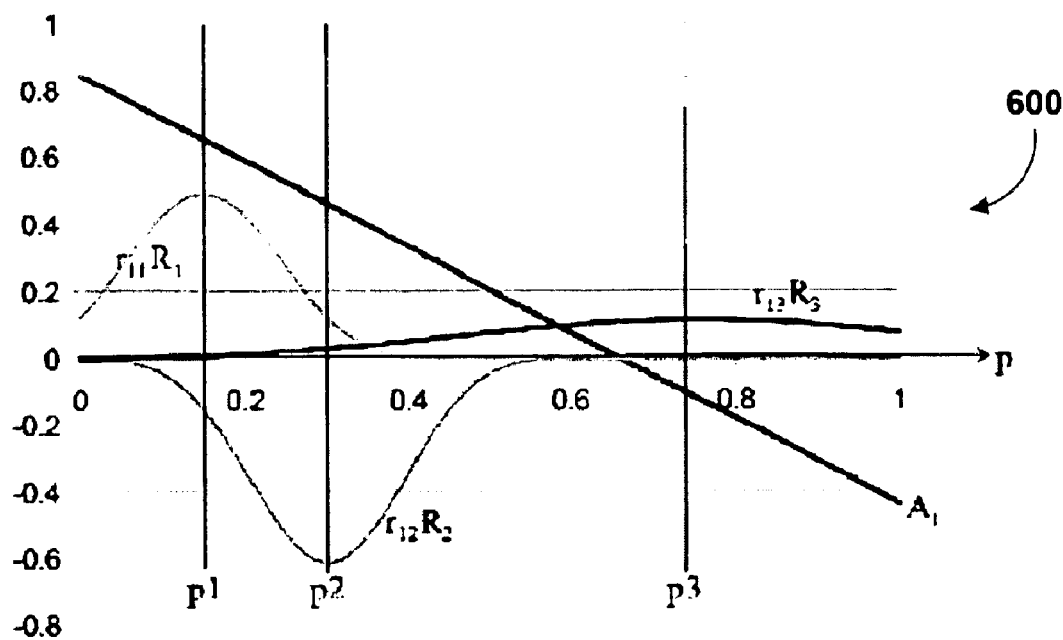
FIG. 6 is a diagram showing linear and radial parts of a cardinal basis function.

FIG. 6 shows the linear approximation and the three radial basis functions associated with the first of three examples for a simple one-dimensional abstract space 600. The three examples are located at p=0.15 (p1), 0.30 (p2), and 0.75 (p3). The straight line labeled A1 is the line that fits best through (0.15, 1), (0.3, 0), and (0.75, 0). In the one dimensional problem, a best fit line for any particular DOF could then be evaluated simply scaling the individual lines associated with each example by the DOF values and summing.

While FIG. 6 shows the use of a linear approximation, other choices could certainly be made. When a particular motion has an understood underlying structure which can be well approximated by a fixed-order polynomial, then the linear approximation step may be replaced with a step based on that particular polynomial.

Since the linear approximations generally do not fully define a cardinal basis by passing through the values 1 and 0, there still remain residuals between the example values $x_i$ and the scaled and summed hyperplanes. Rather than cast our interpolations over DOFs, we continue to create the cardinal bases. The residuals in the cardinal bases are given by $$q_{i1,i2} = \delta_{i1,i2} \sum_{l=0}^{D} a_{i2,l} A_l(p_{i1})$$

In the one-dimensional problem illustrated in FIG. 6, these are just the distances from the line to the desired values of 1, 0, and 0 at p1, p2, and p3. To account for these residuals, we associate N radial basis functions with each example. Since there are N examples, we need $N^2$ radial basis functions. We solve for the weights of each radial basis, $r_{i2,i1}$, to account for the residuals such that when the weighted radial bases are summed with the linear approximation, they complete the cardinal bases.

This leaves us with the problem of choosing the specific shape of the radial bases and determining the radial coefficients. Radial basis functions have the form:

$$R_i(d_i(p))$$

where $R_i$ is the radial basis associated with $X_i$ and $d_i(p)$ is a measure of the distance between p and $p_i$, most often the Euclidean norm $\|p-p_i\|$. There are a number of choices for this basis. In a preferred embodiment, a basis with a cross section of a cubic B-spline may be used. This basis has various useful properties, including its compact support which facilitates for local refinement of the adverb space.

The radial basis weights, $r_{i2,i1}$ can now be found by solving the matrix system, $$Qr=q$$

where r is an N by N matrix of the unknown radial basis weights and Q is defined by the radial bases such that $Q_{i1,i2}=R_{i2}(p_{i1})$, the value of the unscaled radial basis function centered on example $i_2$ at the location of example $i_1$. The diagonal terms are all ⅔ since this is the value of the generic B-spline at its center. Many of the off-diagonal terms are zero since the B-spline cross-section drops to zero at twice the distance to the nearest other example.

Referring back to FIG. 6, we see three radial basis functions associated with the first of the three examples. If these three are summed with the linear approximation, we get the first cardinal basis, the line labeled 701 in FIG. 7. Note that it passes through 1 at the location of the first example and is 0 at the other example locations. The same is true for the other two cardinal bases 2 and 3 (represented by lines 702 and 703, respectively).

Figure 7:
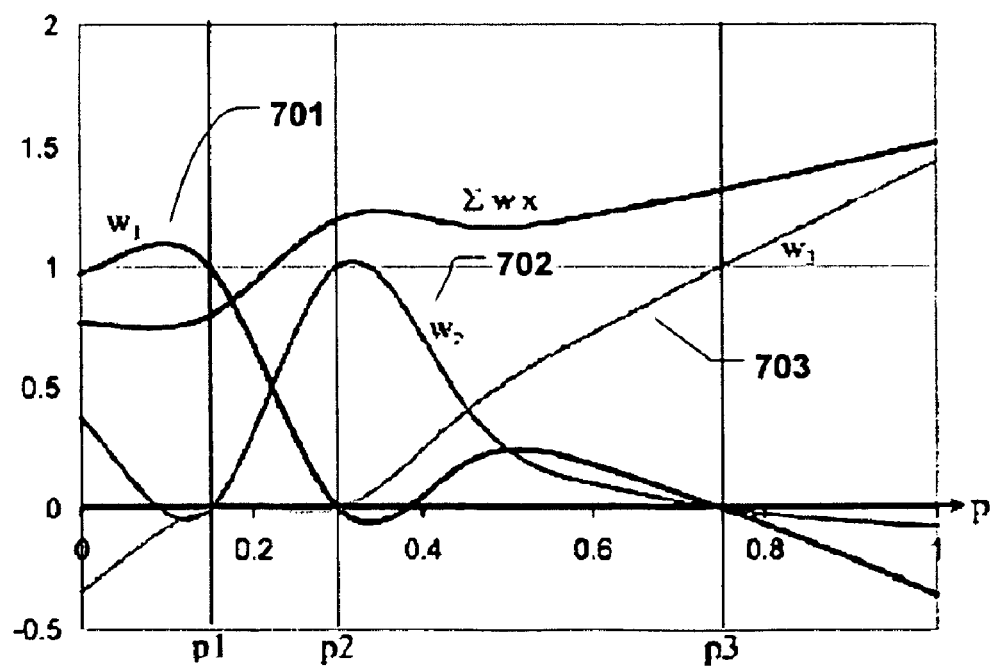
FIG. 7 is a diagram showing cardinal basis functions and a scaled sum, in accordance with aspects of the invention.

Given the solutions for the radial basis weights, we now have all the values needed to evaluate equations (2) and (3) (see above) at runtime. The upper line in FIG. 7 is simply the three cardinal bases scaled by the example values and summed as in Equation (3).

Evaluation of Interpolation—Step 408

After an interpolation has been constructed, it is evaluated to determine whether it is acceptable according to some criterion (step 408). For example, if an animator's goal is to produce realistic looking poses or motions, then the animator can evaluate the interpolation by applying the interpolation function (e.g., the function F described above) to constrains different from the ones having known sample values: the animator can then observe whether the pose is realistic. The evaluation as to whether the interpolation is acceptable can be subjective (e.g., by having a human animator look at and evaluate the interpolated poses). However, there are numerous types of criteria that can be applied, some of which are objective. As discussed below, one way to judge the acceptability of an interpolation is based an "error" quantity—i.e., how much an interpolated pose differs from the parameter that produces it. This quantity can be interpreted as a measure of the warping of the interpolation. Since this is essentially a mathematical calculation, the process of judging the acceptability of an interpolation can be automated when this standard is used.

The following is a preferred technique for judging the acceptability of an interpolation. Consider the inverse-kinematic problem of positioning arm 200 (shown in FIG. 2) at a location p—that is, the problem of determining the angles of the elbows and/or wrists as a function of p. Assume that an interpolation is created by generating some example poses and using the radial-basis technique described above. That technique may not yield a linear parameterization of the space, so there will be a discrepancy between the location in the abstract space, p, and a measured resulting position of the end effector $x_e(p)$. Thus, the "error" is defined as the quantity $\|X_e(p)-p\|$. Using this formula, it is possible to compute an average or maximum error for the interpolation, and these quantities are one way to judge whether an interpolation is acceptable.

Use of New Examples or Pseudo-Examples—Step 410

If it is determined at step 408 that the interpolation is not acceptable, then the process continues to step 410 for new examples. The "examples" referred to at step 410 come in two types: real examples, or pseudo examples. "real" examples are additional sample data that can be used to generate an interpolation function—e.g., additional segments of motion capture, additional 3D animations created by an artist, etc. For example, returning to FIG. 3 for a moment, if sample data is collected by having a human model touch his arm to plus signs 302 and recording the position of the arm, an interpolation function may be created based on these samples. This function may be used to interpolate the pose of an arm touching asterisk 304. However, if the interpolated pose is unacceptable under some criterion (e.g., awkward, unrealistic, excessive deviation from linear approximation, etc.), then a new sample may be created for asterisk 304—i.e., the human model may be asked to touch asterisk 304 so that the position of his arm may be recorded. Essentially, a "real" example provides an extra sample point based on which an interpolation may be based, and the interpolation is reconstructed (step 406) using this additional sample point.

A "pseudo-example" is a new sample point that is added to influence the interpolation function, although it is not based on any measured or actual data. Instead, it is created by examining poses created by an existing interpolation, and then "reasoning backwards" to determine what sample points could be inserted to influence the interpolation in some desired way. (E.g., if a distortion is observed in the original interpolation, then a pseudo-example can be inserted in the "opposite direction" of the distortion in order to smooth out the interpolation function in that area.)

A preferred technique for improving (e.g., reducing the distortion of) an interpolation is:

Find the worst p of the adverb space, i.e., $\max_p \|x_e(p)-p\|$.

Search to find the best p' to minimize $\|X_e(p')-p\|$.

Insert a pseudo-example at p drawn from the location p'—i.e., insert the pseudo example x(p') at p.

Solve for the $w_i$ of the new interpolation space.

A pseudo-example carries no additional DOF positioning data, but is rather a weighted sum of the original examples as defined by Equation (3) (above). Thus solving for the basis functions associated with a pseudo-example is slightly modified from before. Instead of having values 1 at the example location and 0 at all other examples, the new basis is constrained to have the values equivalent to the weights for each example found at p' before the new pseudo-example is inserted. After the insertion of the new pseudo-examples, the new interpolation space is used as usual at runtime.

There is some flexibility in the last two steps of the algorithm above. For example, one could solve for new hyperplanes for each previous example and pseudo-example, given the newly inserted pseudo-example or simply keep the old ones. As another example, one could reset all the radii of the radial basis functions given the new nearest neighbors or keep the old one and only select a new radius for the new pseudo-example. Essentially these are decisions about how local or global the effect of the newly inserted pseudo-example should be. Based on experimentation, keeping the effect of each new pseudo-example local works best and is also simpler to implement and compute.

Returning to FIG. 4, at some point (perhaps after the addition of one or more real examples and/or pseudo-examples), step 408 will result in a determination that the interpolation function constructed is acceptable. In this case, the design time process is complete, and the process continues to step 412, wherein the interpolation function is applied to some constraint to generate a pose. (E.g., pose arm 200 in a position touching coordinates (1.5, 1.5) with a lacklusterness level of 5, by computing F(1.5, 1.5, 5)=(hand orientation, elbow angle), and then drawing the arm accordingly.)

Forward Kinematics

The techniques described above have been described with reference to inverse-kinematics—i.e., the problem of creating a pose, given some constraint. However, it should be understood that these techniques can also be applied to forward kinematics—i.e., the problem of creating a motion given some constraint. Thus, examples of motion (rather than poses) can be collected and annotated, and an interpolation function can be created from these examples that generates a motion (rather than a pose) as a function of some set of parameters. It should thus be understood that the invention is not limited to inverse-kinematics.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of posing an object comprising:

collecting a plurality of example poses of the object;

annotating the examples with one or more parameters; and creating an interpolation function that passes through the annotated examples, wherein the interpolation function produces one or more degree-of-freedom values for the object based on a given set of parameters, interpolation being based at least in part on a plurality of radial basis functions;

selecting a first set of parameters;

applying the interpolation function to the first set of parameters to generate a first set of one or more degree-of-freedom values; and generating a pose for the object in accordance with the first set of degree-of-freedom values.

2. The method of claim 1, wherein the object has M degrees of freedom, wherein N examples are collected at the collecting step, wherein the annotating step assigns D parameters to each examples, M, N, and D each being positive integers, and wherein the act of creating an interpolation function comprises:

computing a cardinal basis weighting function for each of the N examples using the formula:

$$w_{i1}(p) = \sum_{i2=1}^{N} r_{i2,i1} R_{i2}(p) + \sum_{l=0}^{D} a_{i1,l} A_l(p)$$

wherein i1 and i2 are example indices, wherein $w_{i1}$ denotes a cardinal basis weighting function, wherein $r_{i2,i1}$ is a radial basis function weight, wherein $R_{i2}$ is a radial basis function, wherein $a_{i1,l}$ is a linear coefficient, wherein $A_l$ are the linear bases, wherein p is a point in a D-dimensional annotation space, wherein the interpolation function is given by the formula:

$$x_j(p) = \sum_{i1=1}^{N} w_{i1}(p) x_{i1,j}$$

wherein $x_j$ is the j-th degree of freedom of the object, and wherein $x_{i1,j}$ is the j-th degree of freedom for the i-th example.

3. The method of claim 1, further comprising:

determining that the interpolation function fails to meet a criterion;

adding at least one additional example;

recomputing the interpolation function based on the original annotated example and the at least one additional example.

4. The method of claim 3, wherein the act of adding at least one additional example comprises collecting and annotating sample data.

5. The method of claim 1, further comprising:

exposing the interpolation function to an application program, whereby the application program calls the interpolation function on a first set of parameters, and wherein the interpolation function returns one or more degree-of-freedom values for the object.

6. The method of claim 1, wherein the examples comprise artist-generated poses of the object.

7. The method of claim 1, wherein the examples include at least some poses that have been generated to change the interpolation comprise poses that have been generated to affect the interpolation function, but that do not correspond to any artist-generated data or any captured poses from the real world.

8. A computer-readable medium containing computer-executable instructions for performing a method of interpolating a pose of an object from a plurality of examples, the method comprising:

creating a cardinal basis weighting function corresponding to each of the plurality of examples, each cardinal basis weighting function being based on radial basis functions and linear basis functions; and creating a callable function that computes the pose based on a sum of the plurality of examples, wherein each example in the sum is multiplied by the cardinal basis weighting function corresponding to the example.

9. The computer-readable medium of claim 8, wherein the object has M degrees of freedom, wherein N is the number of examples, wherein each of the N examples is annotated by D parameters, M, N, and D each being positive integers, wherein the cardinal basis weighting functions are created according to the formula:

$$w_{i1}(p) = \sum_{i2=1}^{N} r_{i2,i1} R_{i2}(p) + \sum_{l=0}^{D} a_{i1,l} A_l(p)$$

wherein i1 and i2 are example indices, wherein $w_{i1}$ denotes the cardinal basis weighting function for the i1-th example, wherein $r_{i2,i1}$ is a radial basis function weight, wherein $R_{i2}$ is a radial basis function, wherein $a_{i1,l}$ is a linear coefficient, wherein $A_l$ is a linear bases, wherein p is a point in a D-dimensional annotation space, and wherein the interpolation function is given by the formula:

$$x_j(p) = \sum_{i1=1}^{N} w_{i1}(p) x_{i1,j}$$

wherein $x_j$ is the j-th degree of freedom of the object, and wherein $x_{i1,j}$ is the j-th degree of freedom for the i-th example.

10. The computer-readable medium of claim 8, wherein the method further comprises:

determining that the interpolation function fails to meet a criterion;

adding a pseudo-example;

recomputing the cardinal basis weighting functions based on the original examples and the pseudo-example.

11. The method of claim 8, wherein the callable function is exposable to an application program, which obtains the pose of the object by invoking the callable function a first set of one or more parameters and receiving degree-of-freedom values for the object from the callable function.

12. A method of creating function that produces a pose of an object based on one or more parameters, the method comprising:

creating a first function based on a plurality of examples;

determining that said first function does not satisfy a criterion;

creating a pseudo-example; and creating a second function based on the plurality of examples and the pseudo-example, wherein the second function produces the pose of the object and satisfies the criterion.

13. The method of claim 12, wherein the object has M degrees of freedom, wherein N is the number of examples, wherein D is the number of parameters, M, N, and D each being positive integers, and wherein the act of creating a first function comprises:

computing a cardinal basis weighting function for each of the N examples using the formula:

$$w_{i1}(p) = \sum_{i2=1}^{N} r_{i2,i1} R_{i2}(p) + \sum_{l=0}^{D} a_{i1,l} A_l(p)$$

wherein i1 and i2 are example indices, wherein $w_{i1}$ denotes a cardinal basis weighting function, wherein $r_{i2,i1}$ is a radial basis function weight, wherein $R_{i2}$ is a radial basis function, wherein $a_{i1,l}$ is a linear coefficient, wherein $A_l$ is a linear bases, wherein p is a point in a D-dimensional parameter space, wherein the first function is given by the formula:

$$x_j(p) = \sum_{i1=1}^{N} w_{i1}(p) x_{i1,j}$$

wherein $x_j$ is the j-th degree of freedom of the object, and wherein $x_{i1,j}$ is the j-th degree of freedom for the i-th example.

14. The method of claim 12, wherein the object has M degrees of freedom, each measurable by a value, M being a positive integer, and wherein the second function produces the pose by producing the M degree-of-freedom values for the manipulation.

15. The method of claim 12, wherein the second function produces one or more degree-of-freedom values for the object based on a given set of parameters, and wherein the method further comprises:

selecting a first set of parameters;

applying the interpolation function to the first set of parameters to generate a first set of one or more degree-of-freedom values; and posing the object in accordance with the first set of degree-of-freedom values.

16. A computer-readable medium containing computer-executable instructions for performing a method of creating a function that produces a pose of an object based on one or more parameters, the method comprising:

creating a first function based on a plurality of examples;

determining that said first function does not satisfy a criterion;

creating a pseudo-example; and creating a second function based on the plurality of examples and the pseudo-example, wherein the second function produces the pose of the object and satisfies the criterion.

17. The computer-readable medium of claim 16, wherein the object has M degrees of freedom, wherein N is the number of examples, wherein D is the number of parameters, M, N, and D each being positive integers, and wherein the act of creating a first function comprises:

computing a cardinal basis weighting function for each of the N examples using the formula:

$$w_{i1}(p) = \sum_{i2=1}^{N} r_{i2,i1} R_{i2}(p) + \sum_{l=0}^{D} a_{i1,l} A_l(p)$$

wherein i1 and i2 are example indices, wherein $w_{i1}$ denotes a cardinal basis weighting function, wherein $r_{i2,i1}$ is a radial basis function weight, wherein $R_{i2}$ is a radial basis function, wherein $a_{i1,l}$ is a linear coefficient, wherein $A_l$ are the linear bases, wherein p is a point in a D-dimensional parameter space, wherein the first function is given by the formula:

$$x_j(p) = \sum_{i1=1}^{N} w_{i1}(p) x_{i1,j}$$

wherein $x_j$ is the j-th degree of freedom of the object, and wherein $x_{i1j}$ is the j-th degree of freedom for the i-th example.

18. The computer-readable medium of claim 16, wherein the object has M degrees of freedom, each measurable by a value, and wherein the second function produces the pose by producing the M degree-of-freedom values for the pose.

19. A system for rendering an object on a computing device, the object having one or more degrees of freedom, the system comprising:
a callable function interpolated from a plurality of examples, each example correlating a set of parameters with a pose of the object, the function taking one or more parameters as input and producing a resulting pose as output.

20. The system of claim 19, wherein the callable function expresses the resulting pose in the form of values for each of the object's degrees of freedom.

21. The system of claim 19, wherein the callable function is based on a set of cardinal basis weighting functions having radial and linear parts.

22. The system of claim 19, wherein the object has M degrees of freedom, wherein N is the number of examples, wherein D is the number of parameters, M, N, and D each being positive integers, and wherein the callable function is characterized by the formula:

$$x_j(p) = \sum_{i1=1}^{N} w_{i1}(p) x_{i1,j}$$

wherein $x_j$ is the j-th degree of freedom of the object, wherein $x_{i1j}$ is the j-th degree of freedom for the i-th example, wherein p is a point in a D-dimensional parameter space, and wherein $w_{i1}$ denotes a cardinal basis weighting function given by the formula:

$$w_{i1}(p) = \sum_{i_2=1}^{N} r_{i2,i1} R_{i2}(p) + \sum_{l=0}^{D} a_{i1,l} A_l(p)$$

wherein i1 and i2 are example indices, wherein $w_{i1}$ denotes a cardinal basis weighting function, wherein $r_{i2,i1}$ is a radial basis function weight, wherein $R_{i2}$ is a radial basis function, and wherein $a_{i1,l}$ is a linear coefficient, wherein $A_l$ are the linear bases.

* * * * *

UNITED STATES PATENT AND TRADEMARK OFFICE
CERTIFICATE OF CORRECTION

PATENT NO. : 7,024,279 B2  Page 1 of 1
APPLICATION NO. : 10/875775
DATED : April 4, 2006
INVENTOR(S) : Charles F. Rose, III et al.

It is certified that error appears in the above-identified patent and that said Letters Patent is hereby corrected as shown below:

On the title page, item (56), under "Other Publications", in column 2, line 10, delete "200" and insert -- 2000 --, therefor.

On the title page, item (57), in "Abstract", in column 2, line 11, delete "parts," and insert -- parts. --, therefor.

In column 1, line 34, delete "robots," and insert -- robots. --, therefor.

In column 12, line 39, delete "$P_h$" and insert -- $p_h$ --, therefor.

In column 14, line 26, delete ""real"" and insert -- "Real" --, therefor.

In column 15, line 65, in Claim 1, after "parameters," insert -- the --.

In column 18, line 21, in Claim 13, delete "thej-th" and insert -- the j-th --, therefor.

In column 18, line 22, in Claim 13, delete "thej-th" and insert -- the j-th --, therefor.

In column 20, line 11, in Claim 22, delete "thej-th" and insert -- the j-th --, therefor.

In column 20, line 12, in Claim 22, delete "thej-th" and insert -- the j-th --, therefor.

Signed and Sealed this

Twenty-third Day of March, 2010

David J. Kappos
*Director of the United States Patent and Trademark Office*